(12) United States Patent
Fukuda et al.

(10) Patent No.: US 7,794,018 B2
(45) Date of Patent: Sep. 14, 2010

(54) VEHICLE SEATS

(75) Inventors: Tomokazu Fukuda, Toyota (JP); Masahiro Fujieda, Toyota (JP); Yasuhiro Kojima, Kariya (JP)

(73) Assignees: Toyota Boshoku Kabushiki Kaisha, Aichi-Ken (JP); Aisin Seiki Kabushiki Kaisha, Aichi-Ken (JP)

( * ) Notice: Subject to any disclaimer, the term of this patent is extended or adjusted under 35 U.S.C. 154(b) by 96 days.

(21) Appl. No.: 12/121,890

(22) Filed: May 16, 2008

(65) Prior Publication Data

US 2008/0284197 A1 Nov. 20, 2008

(30) Foreign Application Priority Data

May 17, 2007 (JP) ............... 2007-131358

(51) Int. Cl.
*B60N 2/07* (2006.01)
(52) U.S. Cl. .............. 297/344.11; 296/65.13; 248/429
(58) Field of Classification Search .............. 296/65.13, 296/65.14; 248/429, 430; 297/344.11
See application file for complete search history.

(56) References Cited

U.S. PATENT DOCUMENTS

| | | | |
|---|---|---|---|
| 2,667,912 A | 2/1954 | McCormick | |
| 3,476,435 A | 11/1969 | Hitzelberger | |
| 3,582,033 A | 6/1971 | LaFleche et al. | |
| 3,627,253 A * | 12/1971 | Germain et al. | ............. 248/429 |
| 3,957,312 A | 5/1976 | Bonnaud | |
| 4,615,551 A | 10/1986 | Kinaga et al. | |
| 5,570,931 A | 11/1996 | Kargilis et al. | |
| 5,593,209 A | 1/1997 | Bauer et al. | |
| 5,597,206 A | 1/1997 | Ainsworth et al. | |

(Continued)

FOREIGN PATENT DOCUMENTS

DE 19918600 11/1999

(Continued)

OTHER PUBLICATIONS

English language Abstract of JP 2004-122825 A.

(Continued)

*Primary Examiner*—Dennis H Pedder
(74) *Attorney, Agent, or Firm*—Greenblum & Bernstein, P.L.C.

(57) ABSTRACT

A vehicle seat having a seat cushion may include a pair of slide devices disposed on a vehicle floor, a pair of lock devices respectively provided to the slide devices, and an operation mechanism of the lock devices. The slide devices are arranged and constructed to slide the vehicle seat on the vehicle floor. The lock devices are capable of releasably locking the vehicle seat at a desired position on the vehicle floor. The operation mechanism includes a synchronization member having an operation member. The synchronization member is disposed above the slide devices and is linked to the lock devices via a linking mechanism.

1 Claim, 4 Drawing Sheets

U.S. PATENT DOCUMENTS

| | | | |
|---|---|---|---|
| 5,626,392 A | | 5/1997 | Bauer et al. |
| 5,806,825 A | | 9/1998 | Couasnon |
| 6,152,533 A | | 11/2000 | Smuk |
| 6,161,892 A | * | 12/2000 | Chabanne et al. ........ 296/65.03 |
| 6,257,541 B1 | | 7/2001 | Timon et al. |
| 6,318,802 B1 | * | 11/2001 | Sjostrom et al. ......... 297/344.1 |
| 6,357,814 B1 | * | 3/2002 | Boisset et al. ............ 296/65.03 |
| 6,926,362 B2 | | 8/2005 | Kroner et al. |
| 7,152,923 B2 | | 12/2006 | Charras et al. |
| 2008/0191524 A1 | | 8/2008 | Takai et al. |
| 2008/0191527 A1 | | 8/2008 | Takai et al. |

FOREIGN PATENT DOCUMENTS

| | | |
|---|---|---|
| DE | 102005039903 | 12/2006 |
| EP | 0752338 | 1/1997 |
| EP | 0976606 B1 | 6/2004 |
| JP | 58-199233 A | 11/1983 |
| JP | 2004-122825 A | 4/2004 |

OTHER PUBLICATIONS

English language Abstract of JP 58-199233 A.
U.S. Appl. No. 11/875,255 to Wissner et al., filed Oct. 19, 2007.
U.S. Appl. No. 11/876,919 to Wissner et al., filed Oct. 23, 2007.
U.S. Appl. No. 12/062,750 to Kuno et al., filed Apr. 4, 2008.
U.S. Appl. No. 12/062,086 to Nishikawa et al., filed Apr. 3, 2008.
U.S. Appl. No. 12/061,115 to Kuno, filed Apr. 3, 2008.
English language Abstract of DE 19918600, Nov. 4, 1999.
English language Abstract of DE 102005039903, Dec. 7, 2006.
English language Abstract of EP 0752338, Jan. 8, 1997.

* cited by examiner

VEHICLE SEATS

This application claims priority to Japanese patent application serial number 2007-131358, the contents of which are incorporated herein by reference.

BACKGROUND OF THE INVENTION

The present invention relates to vehicle seats. More particularly, the present invention relates to vehicle seats that can be moved relative to a vehicle floor so that positions thereof can be adjusted.

A mechanism for sliding a vehicle seat and adjusting positions thereof (i.e., a sliding and adjusting mechanism for a vehicle) is already known. The sliding and adjusting mechanism may include a pair of (right and left) slide rails that are disposed on a vehicle floor so as to extend in a longitudinal direction of the vehicle. The sliding and adjusting mechanism is arranged and constructed to move or slide the vehicle seat back and forth along the slide rails. Also, the sliding and adjusting mechanism may include a lock device that is constructed to lock or immobilize the vehicle seat at a desired position on the slide rails (i.e., the vehicle floor).

The lock device may include a pair of lock members that are respectively attached to a seat cushion of the vehicle seat. The lock members are arranged and constructed to be engaged with and disengaged from the slide rails. The lock members are respectively linked to a U-shaped operation handle that is disposed under the seat cushion of the vehicle seat. Therefore, when the operation handle is operated, the lock members are simultaneously disengaged from the slide rails so that the lock device can be unlocked. Upon unlocking of the lock device, the vehicle seat can be released so as to be moved along the slide rails. Such a vehicle seat is taught, for example, by Japanese Laid-Open Patent Publication Number 2004-122825.

However, in the known vehicle seat, the U-shaped operation handle is disposed under the seat cushion of the vehicle seat. As a result, it is not possible to beneficially use a space between the seat cushion and the floor.

BRIEF SUMMARY OF THE INVENTION

For example, in one aspect of the present invention, a vehicle seat having a seat cushion may include a pair of slide devices disposed on a vehicle floor, a pair of lock devices respectively provided to the slide devices, and an operation mechanism of the lock devices. The slide devices are arranged and constructed to slide the vehicle seat on the vehicle floor. The lock devices are capable of releasably locking the vehicle seat at a desired position on the vehicle floor. The operation mechanism includes a synchronization member having an operation member. The synchronization member is disposed above the slide devices and is linked to the lock devices via a linking mechanism.

According to the vehicle seat thus constructed, it is possible to beneficially or effectively use a space under the seat cushion, i.e., a space between the seat cushion and the vehicle floor.

In one embodiment, the synchronization member is disposed between both side portions of the seat cushion. The operation member is connected to the synchronization member so as to be positioned on one of the side portions of the seat cushion. Further, the linking mechanism is arranged and constructed such that the lock device can be released when the synchronization member is operated via the operation member.

Other objects, features and advantages of the present invention will be readily understood after reading the following detailed description together with the accompanying drawings and the claims.

DETAILED DESCRIPTION OF THE INVENTION

A detailed representative embodiment of the present invention is shown in FIG. 1 to FIG. 4.

Figure 1:
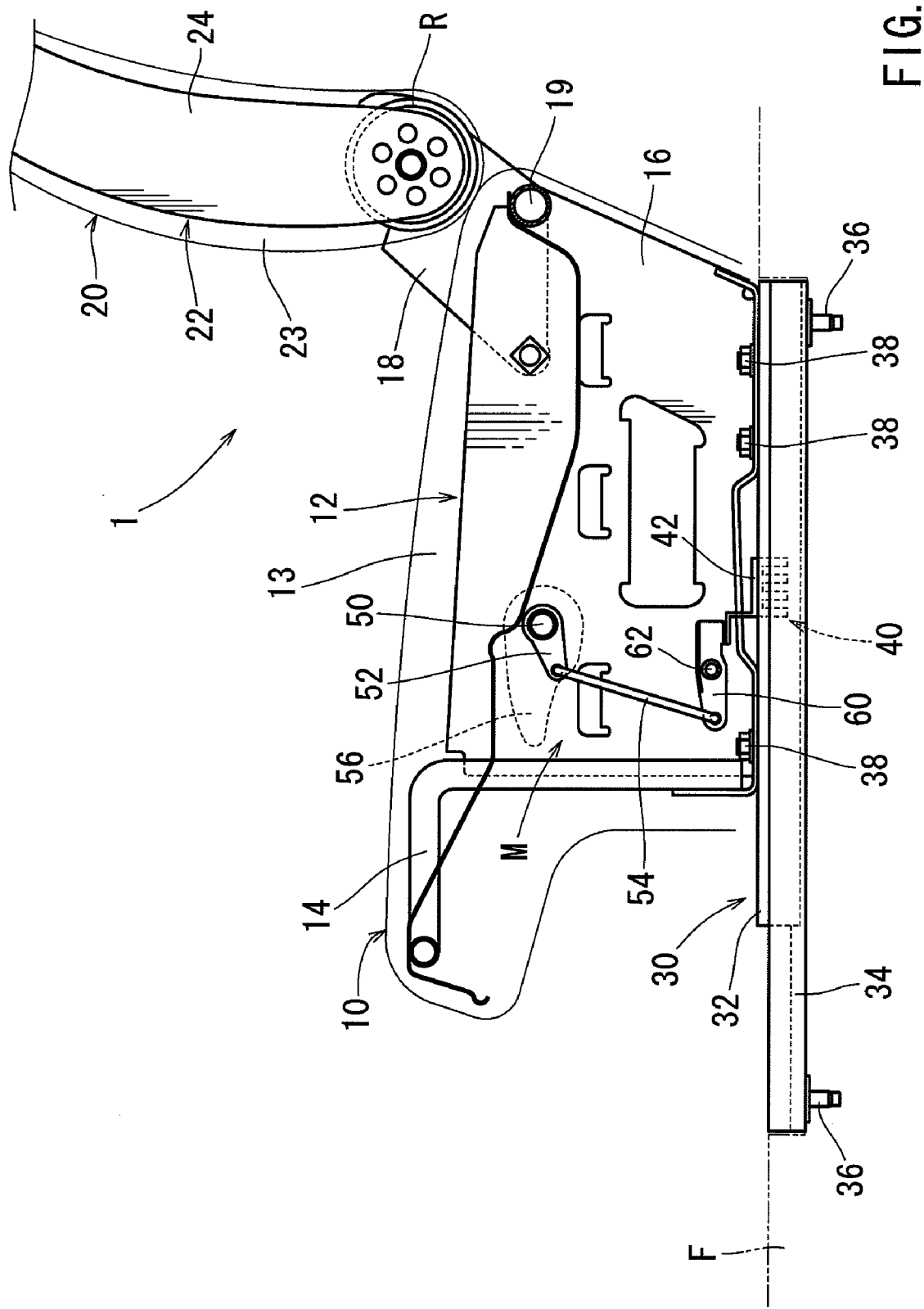
FIG. 1 is a side view of a vehicle seat according to a representative embodiment of the present invention, which schematically illustrates a framework thereof.
Figure 2:
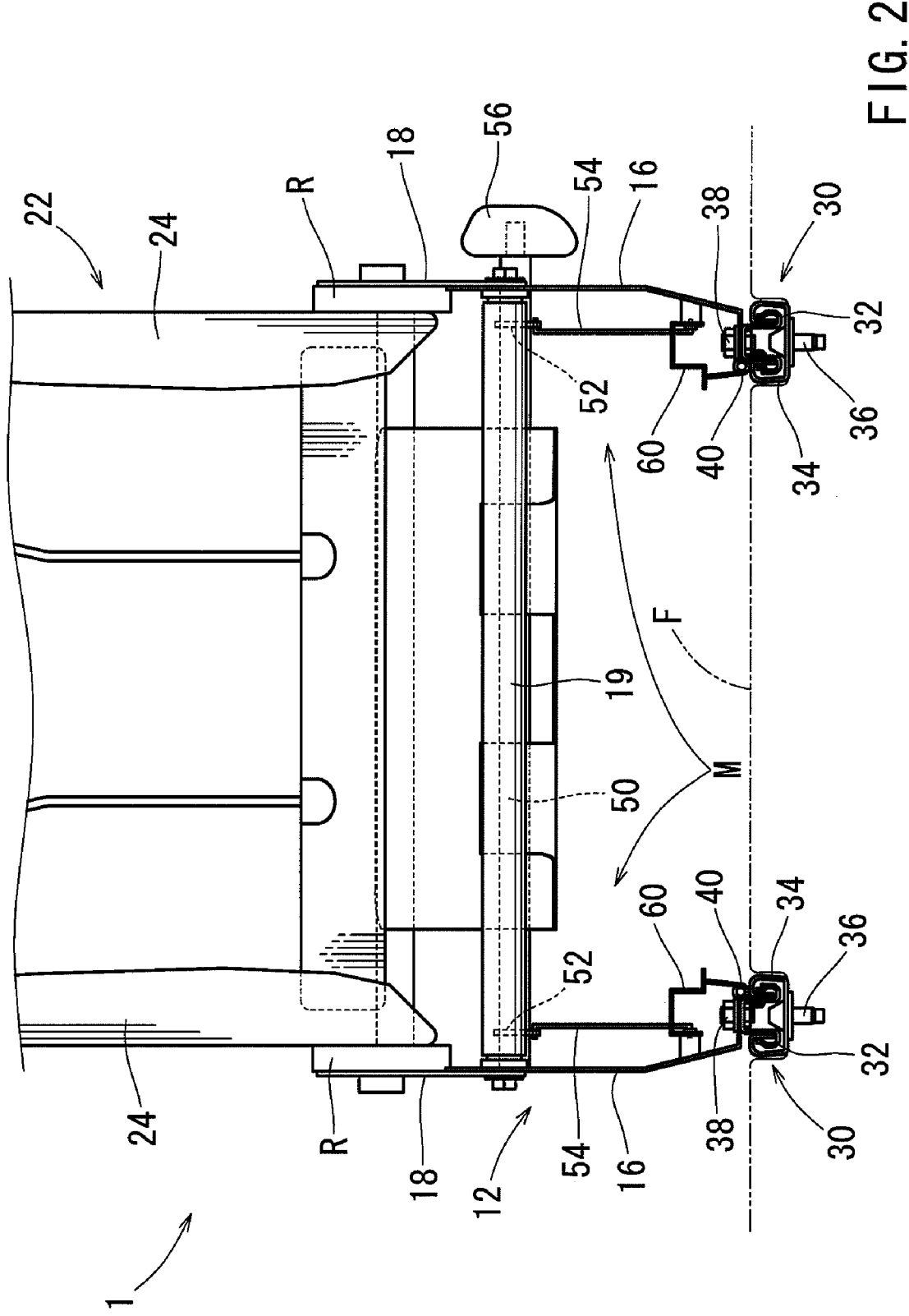
FIG. 2 is a rear view of the vehicle seat, which illustrates the framework thereof.

As shown in FIGS. 1 and 2, a representative vehicle seat 1 may preferably include a seat cushion 10 and a seat back 20. The seat cushion 10 may preferably be constituted of a cushion frame 12 and a pad 13 attached to the cushion frame 12. The cushion frame 12 is composed of a tubular front frame element 14 and a pair of plate-shaped side frame elements 16. The cushion frame 12 further includes reclining plates 18 that are respectively attached to rear end portions of the side frame elements 16. Further, as best shown in FIG. 2, the side frame elements 16 are connected to each other via a connecting rod 19. As a result, the cushion frame 12 can be reliably reinforced so as to have desired strength.

Similarly, the seat back 20 may preferably be constituted of a back frame 22 and a pad 23 attached to the back frame 22. Further, the back frame 22 includes a pair of plate-shaped side frame elements 24. Lower end portions of the side frame elements 24 are respectively rotatably connected to the reclining plates 18 of the cushion frame 12 via seat reclining devices R, so that a tilting angle of the back frame 22 (the seat back 20) relative to the cushion frame 12 (the seat cushion 10) can be adjusted by operating the seat reclining devices R (i.e., by switching the seat reclining devices R between a locked condition and an unlocked condition). As will be appreciated, the seat reclining devices R are arranged and constructed to be operated in synchronism with each other, so as to be simultaneously changed between the locked condition and the unlocked condition by simply operating an operation lever (not shown) that is generally attached to one of side portions of the seat cushion 10.

As shown in FIGS. 1 and 2, the vehicle seat 1 may further include a pair of (right and left) slide rail assemblies (slide devices) 30 that are disposed on a floor F of a vehicle (not shown) so as to extend in a longitudinal direction of the vehicle. The slide rail assemblies 30 are arranged and constructed such that the vehicle seat 1 can move or slide back and forth in the longitudinal direction of the vehicle.

In particular, each of the slide rail assemblies 30 may preferably include an elongated lower rail 34 and an elongated upper rail 32. The lower rail 34 is positioned on the floor F so as to extend in the longitudinal direction of the vehicle and is connected thereto via a plurality of fixture pins 36. Conversely, the upper rail 32 slidably engages the lower rail 34 so as to slide or move therealong. Further, the upper rail 32 is connected to the side frame element 16 of the cushion frame 12 via a plurality of fixture bolts 38. That is, the upper rail 32 is connected to the seat cushion 10 (the vehicle seat 1).

Figure 3:
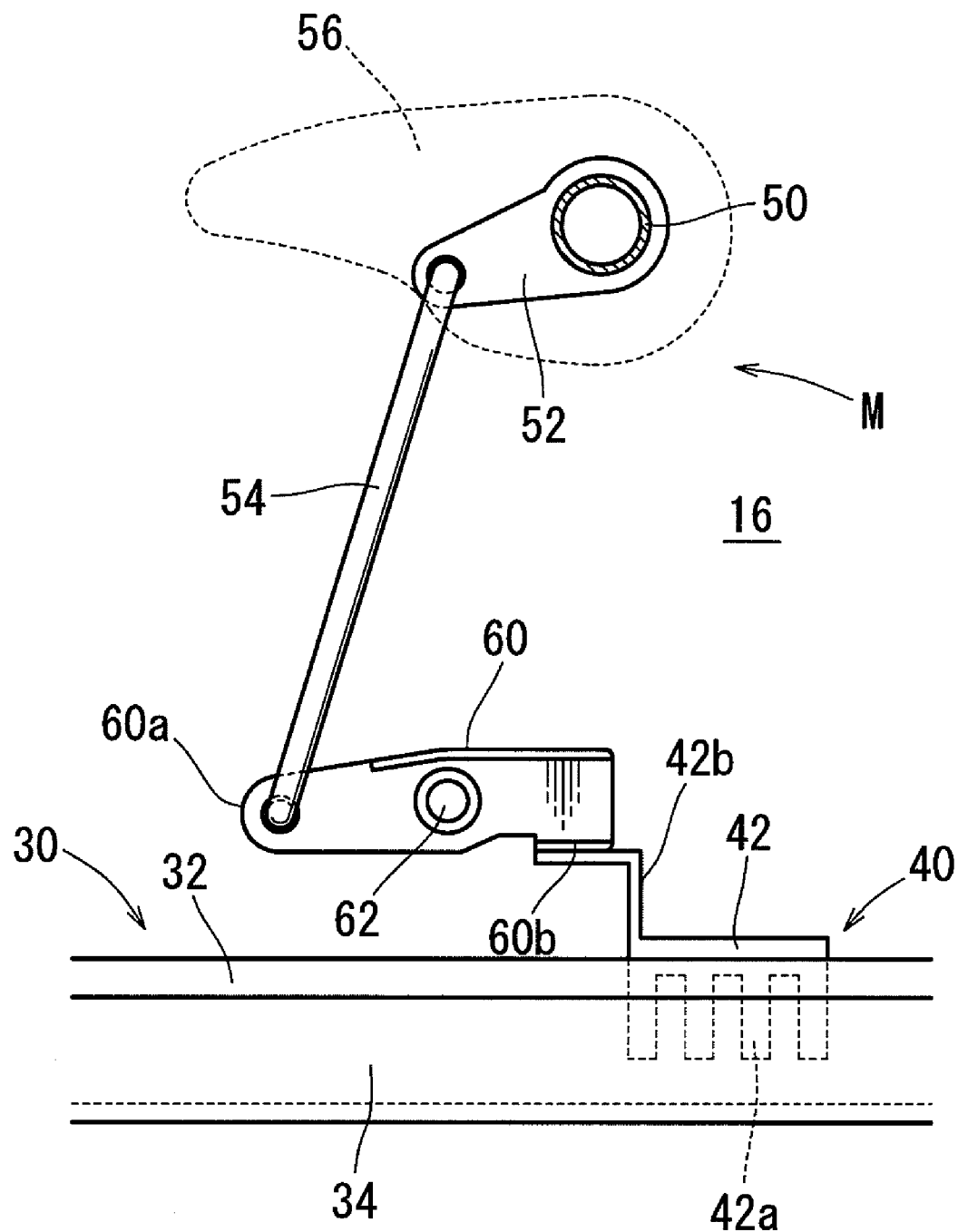
FIG. 3 is a partially enlarged view of FIG. 1.
Figure 4:
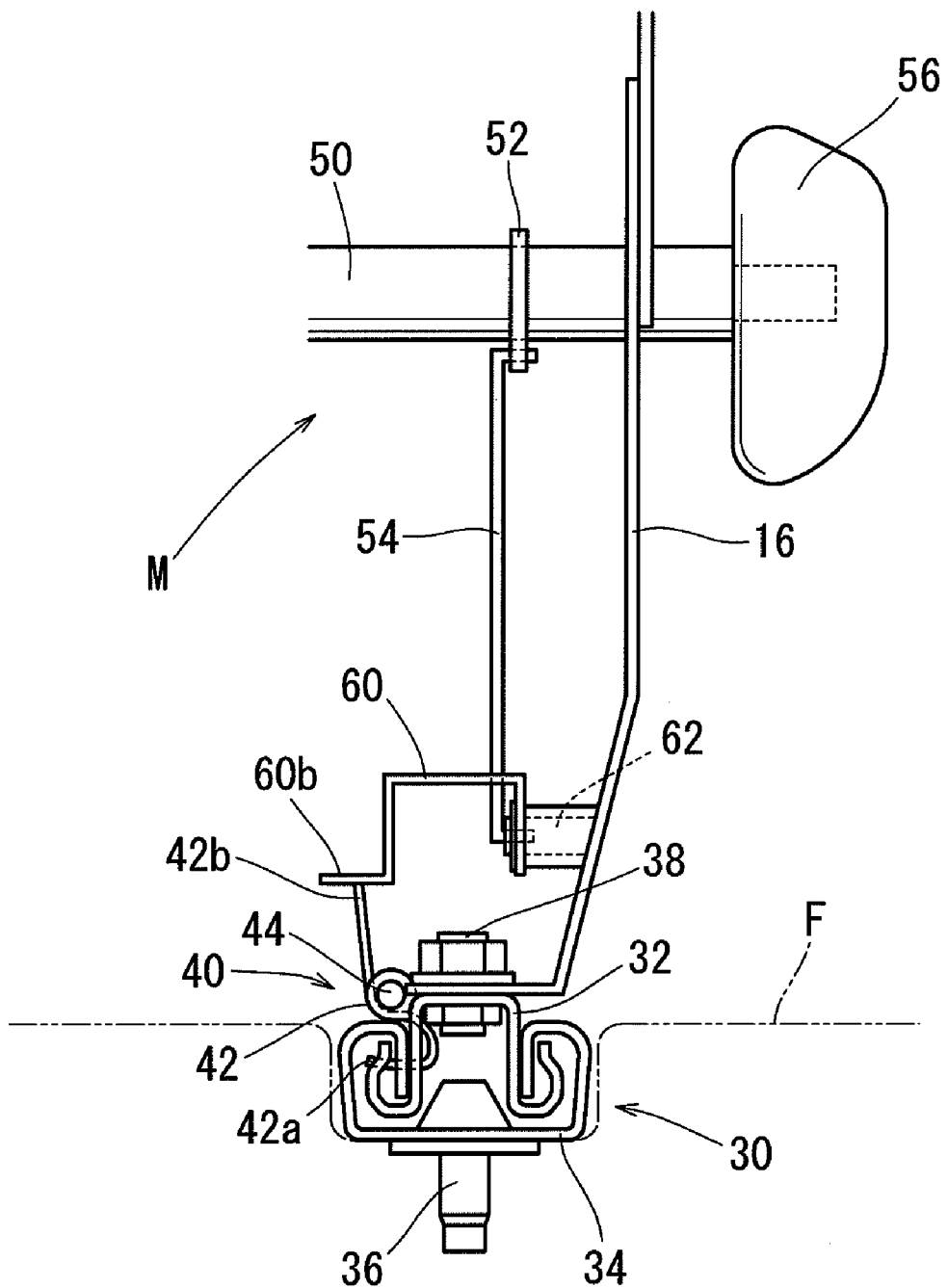
FIG. 4 is a partially enlarged view of FIG. 2.

Each of the slide rail assemblies 30 may further include a lock device 40 that can releasably lock or immobilize the upper rail 32 on the lower rail 34, thereby immobilizing the vehicle seat 1 thereon. As best shown in FIGS. 3 and 4, the lock device 40 may preferably include a lock member 42. As shown in FIG. 4, the lock member 42 is pivotally connected to the upper rail 32 in the middle thereof via a hinge pin 44, so as to transversely rotate relative to the upper and lower rails 32 and 34. The lock member 42 may preferably include a bent fork-shaped lower engagement portion 42a and an upper arm portion 42b. The lower engagement portion 42a is downwardly extended relative to the hinge pin 44. Also, the lower engagement portion 42a is shaped so as to be engaged with and disengaged from engagement apertures or slots (not shown) formed in the lower rail 34 via through holes (not shown) formed in the upper rail 32 upon rotation of the lock member 42. Conversely, the upper arm portion 42b is upwardly vertically extended relative to the hinge pin 44.

As will be recognized, when the lower engagement portion 42a of the lock member 42 of the lock device 40 engages the engagement slots of the lower rails 34 via the through holes of the upper rail 32, the lock device 40 can be locked, so that the upper rail 32 can be locked or immobilized on the lower rail 34. As a result, the vehicle seat 1 connected to the upper rail 32 can be locked or immobilized on the floor F.

Further, the engagement slots of the lower rail 34 may preferably be formed over the entire length of the lower rail 34 at desired intervals, so that the upper rail 32 can be positioned and immobilized at a desired position on the lower rail 34.

In addition, a first biasing member or torsion spring (not shown) is provided between the lock member 42 and the hinge pin 44. The torsion spring is arranged such that the lock member 42 is normally biased clockwise in FIG. 4 about the hinge pin 44. That is, the first torsion spring is arranged such that the lock member 42 is normally biased in such a direction in which the lower engagement portion 42a thereof can be engaged with the engagement slots of the lower rail 34 (i.e., in such a direction that the lock device 40 can be locked). Therefore, in order to disengage the lower engagement portion 42a from the engagement slots of the lower rail 34 (i.e., in order to unlock the lock device 40), the lock member 42 is rotated against a spring force of the first torsion spring.

Next, an operation mechanism M of the lock devices 40 will be described.

As best shown in FIG. 2, the operation mechanism M may preferably include a pair of unlocking arms 60 that respectively correspond to the lock devices 40. The unlocking arms 60 are respectively disposed inside the side frame elements 16. As best shown in FIG. 3, each of the unlocking arms 60 is rotatably attached to the side frame element 16 in the middle thereof via a pivot pin 62. Further, as best shown in FIG. 2, the operation mechanism M may further include a pair of cantilever link arms 52 that are respectively disposed above the unlocking arms 60. Each of the link arms 52 is fixedly connected to an operation shaft (a synchronization member) 50 that is transversely disposed between the side frame elements 16. The operation shaft 50 are rotatably attached to the side frame elements 16 at both ends thereof. Further, a second biasing member or torsion spring (not shown) may preferably be provided between the operation shaft 50 and the side frame elements 16. The second torsion spring is arranged such that the operation shaft 50 is normally biased counterclockwise in FIG. 3. In addition, an operation handle (an operation member) 56 is provided to one end (the right end in FIG. 2) of the operation shaft 50, so as to be positioned adjacent to the side frame element 16 (the side frame element 16 on the right side in FIG. 2), i.e., so as to be positioned on one of the side portions of the seat cushion 10.

As shown in FIGS. 2 and 3, first or front ends 60a of the unlocking arms 60 are respectively linked to the link arms 52 via wires 54, so that the unlocking arms 60 can be rotated clockwise in FIG. 3 about the pivot pins 62 when the operation shaft 50 is rotated in the corresponding direction. Conversely, second or rear ends 60b of the unlocking arms 60 may respectively contact the upper arm portions 42b of the lock members 42 so as to press the upper arm portions 42b downward when the unlocking arms 60 are rotated clockwise in FIG. 3.

Next, an operation of the vehicle seat 1 thus constructed will be described.

In order to slide or move the vehicle seat 1 back and forth on the floor F and to position and immobilize the vehicle seat 1 at a desired position on the floor F, the operation handle 56 of the operation mechanism M is first rotated clockwise in FIG. 3, thereby rotating the operation shaft 50 in the same direction against a spring force of the second torsion spring. Upon rotation of the operation shaft 50, the wires 54 are pulled upwardly via the link arms 52, so that both of the unlocking arms 60 are synchronously rotated clockwise in FIGS. 1 and 3 about the pivot pins 62. As a result, the upper arm portions 42b of the lock members 42 may preferably be pressed downward via the rear ends 60b of the unlocking arms 60, so that the lock members 42 is rotated counterclockwise in FIG. 4 about the hinge pins 44 against the spring force of the first torsion spring. Upon rotation of the lock member 42, the lower engagement portions 42a of the lock members 42 may preferably be disengaged from the engagement slots of the lower rails 34, so that the lock devices 40 can respectively be unlocked. As a result, the upper rails 32 can be freely slid back and forth along the lower rails 34, so as to be positioned at the desired position on the lower rails 34. Consequently, the vehicle seat 1 connected to the upper rails 32 can be freely moved back and forth along the lower rails 34, so as to be positioned at the desired position on the lower rails 34. Thus, the vehicle seat 1 can be positioned at the desired position on the floor F.

After the upper rails 32 are positioned at the desired position on the lower rails 34, the operation handle 56 of the operation mechanism M is released. As a result, the operation shaft 50 is automatically rotated counterclockwise in FIG. 3 by the spring force of the second torsion spring, so that the unlocking arms 60 are rotated counterclockwise in FIGS. 1 and 3 about the pivot pins 62. Upon rotation of the unlocking arms 60, the lock members 42 are rotated clockwise in FIG. 4 about the hinge pins 44 by the spring force of the first torsion spring. Consequently, the lower engagement portions 42a of the lock members 42 may preferably be engaged with the engagement slots of the lower rails 34 again, so that the lock devices 40 are respectively locked again. As a result, the upper rail 32 may preferably be immobilized at the desired position on the lower rails 34. Thus, the vehicle seat 1 connected to the upper rail 32 may preferably be immobilized at the desired position on the lower rails 34, so as to be immobilized at the desired position on the floor F.

According to the vehicle seat 1 of the present embodiment, the operation handle 56 can be disposed on one of the side portions of the seat cushion 10. That is, it is not necessary to dispose the operation handle 56 under the seat cushion 10. Therefore, as best shown in FIGS. 1 and 2, it is possible to beneficially or effectively use a space under the seat cushion 10 (i.e., a space between the seat cushion 10 and the floor F).

Further, the operation shaft 50 of the operation mechanism M is linked to the lock devices 40 via a simplified linking mechanism (i.e., the link arms 52, the wires 54 and the unlocking arms 60). This may lead to a reduced manufacturing cost of the vehicle seat 1.

Naturally, various changes and modifications may be made to the present invention without departing from the scope of the invention. For example, the position of the operation shaft 50 can be changed longitudinally and vertically, if necessary.

Further, the linking mechanism can be modified, if necessary. For example, the unlocking arms 60 can be directly linked to the link arms 52 without using the wires 54, if necessary.

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. A vehicle seat comprising:

a seat cushion having first and second sides in a vehicle width direction;

first and second slide devices adapted to be disposed on a vehicle floor;

first and second lock devices respectively provided to the first and second slide devices, the first and second lock devices being in releasable engagement with the first and second slide devices, respectively;

first and second side plates connecting the first and second sides of the seat cushion to the first and second lock devices, respectively;

an operation mechanism including a synchronization shaft disposed below the seat, the synchronization shaft being pivoted at its first and second ends to the first and second side plates, respectively, to rotate, first and second upper link members connected to the synchronization shaft close to the first and second side plates, respectively, first and second lower link members pivoted to the first and second side plates, respectively, for rotation, a first connecting wire connecting between one end of the first lower link member and a distal end of the first upper link member, and a second connecting wire connecting between one end of the second lower link member and a distal end of the second upper link member; and a handle connected to one end of the synchronization shaft, wherein when the handle is operated in one direction, the first and second upper link members are rotated in parallel to the first and second side plates, respectively, the resulting rotations of the respective first and second upper link members cause the first and second connecting wires to move in parallel to the first and second side plates, respectively, the resulting movements of the respective first and second connecting wires cause the first and second lower link members to rotate in parallel to the first and second side plates, respectively, and the resulting rotations of the respective first and second lower link members release the first and second lock devices, respectively, which allows the seat to move to a desired position.

* * * * *